United States Patent
Pauli

(10) Patent No.: US 11,414,021 B1
(45) Date of Patent: Aug. 16, 2022

(54) DEVICES AND METHODS TO STORE AND TRANSPORT ARTICLES

(71) Applicant: Richard B. Pauli, Hayward, WI (US)

(72) Inventor: Richard B. Pauli, Hayward, WI (US)

(*) Notice: Subject to any disclaimer, the term of this patent is extended or adjusted under 35 U.S.C. 154(b) by 0 days.

(21) Appl. No.: 16/900,307

(22) Filed: Jun. 12, 2020

Related U.S. Application Data

(60) Provisional application No. 62/861,188, filed on Jun. 13, 2019.

(51) Int. Cl.
*B60R 9/048* (2006.01)
*B60R 9/045* (2006.01)

(52) U.S. Cl.
CPC .............. *B60R 9/048* (2013.01); *B60R 9/045* (2013.01)

(58) Field of Classification Search
CPC ......... B60R 9/048; B60R 9/052; B60R 9/058; B60R 9/08; B60R 9/10; B60R 9/12; B60R 9/04; B60P 3/10; B60P 3/1008; B60P 3/1006
USPC .................................. 224/324–327, 329–330
See application file for complete search history.

(56) References Cited

U.S. PATENT DOCUMENTS

| | | | | |
|---|---|---|---|---|
| 5,292,045 A * | 3/1994 | Mandel | ...................... | B60R 9/00 224/309 |
| 6,164,507 A * | 12/2000 | Dean | ........................ | B60R 9/08 224/319 |
| 6,561,396 B2 * | 5/2003 | Ketterhagen | ........... | B60R 9/042 224/310 |
| 8,136,708 B2 * | 3/2012 | Sautter | ...................... | B60R 9/08 224/321 |
| 9,187,047 B2 * | 11/2015 | Sautter | ..................... | B60R 9/045 |
| 9,266,478 B2 * | 2/2016 | Patel | ....................... | B60R 9/058 |
| 10,246,025 B1 * | 4/2019 | Knigge | ................... | B60R 9/048 |
| 10,343,617 B2 * | 7/2019 | Cox | .......................... | B60R 9/06 |
| 10,780,837 B2 * | 9/2020 | Sautter | ................... | B60R 9/045 |
| 2003/0173384 A1 * | 9/2003 | Clark | ....................... | B63B 32/87 224/314 |
| 2005/0082325 A1 * | 4/2005 | Bourne | .................... | B60R 9/08 224/319 |
| 2015/0089779 A1 * | 4/2015 | Lawrence | ................ | B60R 9/10 24/68 BT |

* cited by examiner

*Primary Examiner* — Scott T McNurlen
(74) *Attorney, Agent, or Firm* — Winthrop & Weinstine, P.A.

(57) ABSTRACT

The disclosure provides a rack system for securing articles. The rack system can include a longitudinal elongate rail traversing a longitudinal direction, and a lateral rail adjustably mounted to the elongate rail. The lateral rail can be orthogonally oriented (or obliquely oriented) with respect to the longitudinal elongate rail. The lateral rail can be configured to be mounted at a plurality of longitudinal positions along the longitudinal rail. The rack can further include one or more upwardly extending brackets that are adjustably mounted to the lateral rail. The upwardly extending bracket(s) can be mounted at one or more lateral positions along the lateral rail. The lateral rail and the upwardly extending bracket(s) cooperate to form a concavity for at least partially surrounding a portion of an article to hold the article in position when mounted to the system.

19 Claims, 18 Drawing Sheets

DEVICES AND METHODS TO STORE AND TRANSPORT ARTICLES

CROSS-REFERENCE TO RELATED APPLICATIONS

The present patent application claims the benefit of priority to U.S. Provisional Patent Application No. 62/861,188, filed Jun. 13, 2019. The aforementioned patent application is hereby incorporated by reference herein in its entirety for any purpose whatsoever.

BACKGROUND

Various attempts have been made at designing specialty roof racks for the safe storage and transport of personal water craft (e.g., kayaks, crew shells and the like). However, Applicant has come to appreciate that current approaches have considerable limitations. The present disclosure improves upon the state of the art.

SUMMARY

Aspects of the present disclosure relate to, among other things, the safe storage and transport of personal watercraft, including but not limited to kayaks and crew shells. Those of skill in the art will recognize that the present disclosure encompasses the safe storage and transport of other articles as well.

Thus, in some aspects, the disclosure provides a rack system for securing articles. The rack system can include a longitudinal elongate rail traversing a longitudinal direction, and a lateral rail adjustably mounted to the elongate rail. The lateral rail can be orthogonally oriented (or obliquely oriented) with respect to the longitudinal elongate rail. The lateral rail can be configured to be mounted at a plurality of longitudinal positions along the longitudinal rail. The rack can further include one or more upwardly extending brackets that are adjustably mounted to the lateral rail. The upwardly extending bracket(s) can be mounted at one or more lateral positions along the lateral rail. The lateral rail and the upwardly extending bracket(s) cooperate to form a concavity for at least partially surrounding a portion of an article to hold the article in position when mounted to the system.

If desired, the system can further include one or more brackets to removably mount the longitudinal elongate rail to a support. In some implementations, the lateral rail and the at least one upwardly extending bracket can have a flat cross-section, but other shaped cross sections may be used, such as circular, rectangular and the like. The lateral rail can be narrower in width than the upwardly extending bracket(s) to permit lengthwise edges of the at least one upwardly extending bracket to overlap and pass beyond lengthwise edges of the lateral rail to permit the components to be slid over one another. However, it will be appreciated that the system can be configured such that the lateral rail can be wider than or the same width as the upwardly extending bracket(s).

In some implementations, the longitudinal elongate rail can act as or otherwise define a longitudinal track to permit the lateral rail to slide along the longitudinal direction. Similarly, the lateral rail can act as or otherwise define a lateral track to permit the upwardly extending bracket(s) to slide along the lateral direction so they can move away from or toward one another along the lateral rail.

In some implementations, the upwardly extending bracket(s) can be straight or curved and defines a concave shape for receiving a portion of the article to be stored or transported. The upwardly extending bracket(s) can be bent to define a plurality of straight (and/or curved) sections that cooperate to define a concave shape for receiving the portion of the article. The components of the brackets are preferably removable from the elongate rail, so as to permit the elongate rail to remain attached to a support without the presence of any of the bracket hardware.

In further implementations, the system can further include one or more integral or removable pads. These pads can be removably attached to an inner surface of the upwardly extending bracket(s), the lateral rail, or a strap or sling that is used to hold the article in place within the system. The pad(s) can be shaped and positioned to conformably receive a portion of the article being stored or transported.

In some implementations, two upwardly extending brackets can be provided wherein a removable pad is attached to each of the brackets. The pad can be configured as a sling, or a cradle between the two brackets.

As alluded to above, the system can further include one or more straps. Each strap can have a first end attached to one of the brackets and a second end configured to be routed about the brackets to traverse around the article to be stored or transported and attached to the first end of the strap, such as via an adjustable buckle.

In further implementations, the system can include a supplementary bracket for coupling to an accessory on the article being transported, such as the outrigger on a canoe. The supplementary bracket can be attached at a first end to the longitudinal elongate rail, and can include a second end for receiving the outrigger. The bracket can also be coupled to an upwardly extending bracket of the system, as described in further detail below.

If desired, the system can further include a padded end at each end of the longitudinal elongate rail to prevent collision between ends of the longitudinal elongate rail and a hood or hatch of a vehicle when the hood or hatch of the vehicle is raised. In accordance with a further embodiment, the system can further include one or more oar cradles adjustably attached to at least one of the longitudinal elongate rail and the lateral rail.

The disclosure further provides a system for storing articles or carrying articles on top of a vehicle, for example. The system includes a longitudinal elongate rail traversing a longitudinal direction, and a lateral rail adjustably mounted to the elongate rail. The lateral rail can be obliquely or orthogonally oriented with respect to the longitudinal elongate rail, for example. The lateral rail can being configured to be mounted at a plurality of longitudinal positions along the longitudinal rail. The system can further include a length of padding removably mounted to the lateral rail. The length of padding can be configured and arranged to cushion a portion of an article when the article is mounted onto the system. If desired, the system can further include one or more brackets for removably mounting the longitudinal elongate rail to a support.

The disclosure further includes methods of mounting an article to a storage location or the roof of a cart or vehicle such as a motor vehicle or a trailer. In some implementations, the method includes attaching a longitudinal elongate rail to a support, such as the roof rack of a vehicle. The longitudinal elongate rail traverses a longitudinal direction, such as parallel to a length of the vehicle. The method further includes attaching a lateral rail to the elongate rail. The lateral rail can be orthogonally or obliquely oriented with respect to the longitudinal elongate rail. The lateral rail can be configured to be mounted at a plurality of longitudinal positions along the longitudinal rail. The method further includes attaching at least one upwardly extending bracket to the lateral rail to form a concavity for receiving the article. The at least one upwardly extending bracket can be configured to be mounted at a plurality of lateral positions along the lateral rail. The method can further include mounting the article to the at least one upwardly extending bracket.

In some implementations, attaching the lateral rail to the elongate rail can include sliding the lateral rail along the elongate rail to a desired position, and affixing the lateral rail in place with respect to the elongate rail. Attaching the at least one bracket to the lateral rail can include sliding the at least one upwardly extending bracket along the lateral rail to a desired position and affixing the at least one upwardly extending bracket in place with respect to the lateral rail. The method can further include, for example, affixing a padded sling to the at least one upwardly extending bracket, the padded sling being configured for receiving a bottom surface of the article.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn, in various implementations, to systems and related methods for attaching articles to supports, vehicles, carts, or trailers, for example. Reference now will be made in detail to aspects of the present disclosure, examples of which are illustrated in the accompanying drawings. Wherever possible, the same reference numbers will be used throughout the drawings to refer to the same or like parts. As used herein, the terms "comprises," "comprising," or any other variation thereof, are intended to cover a non-exclusive inclusion such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal."

Figure 1:
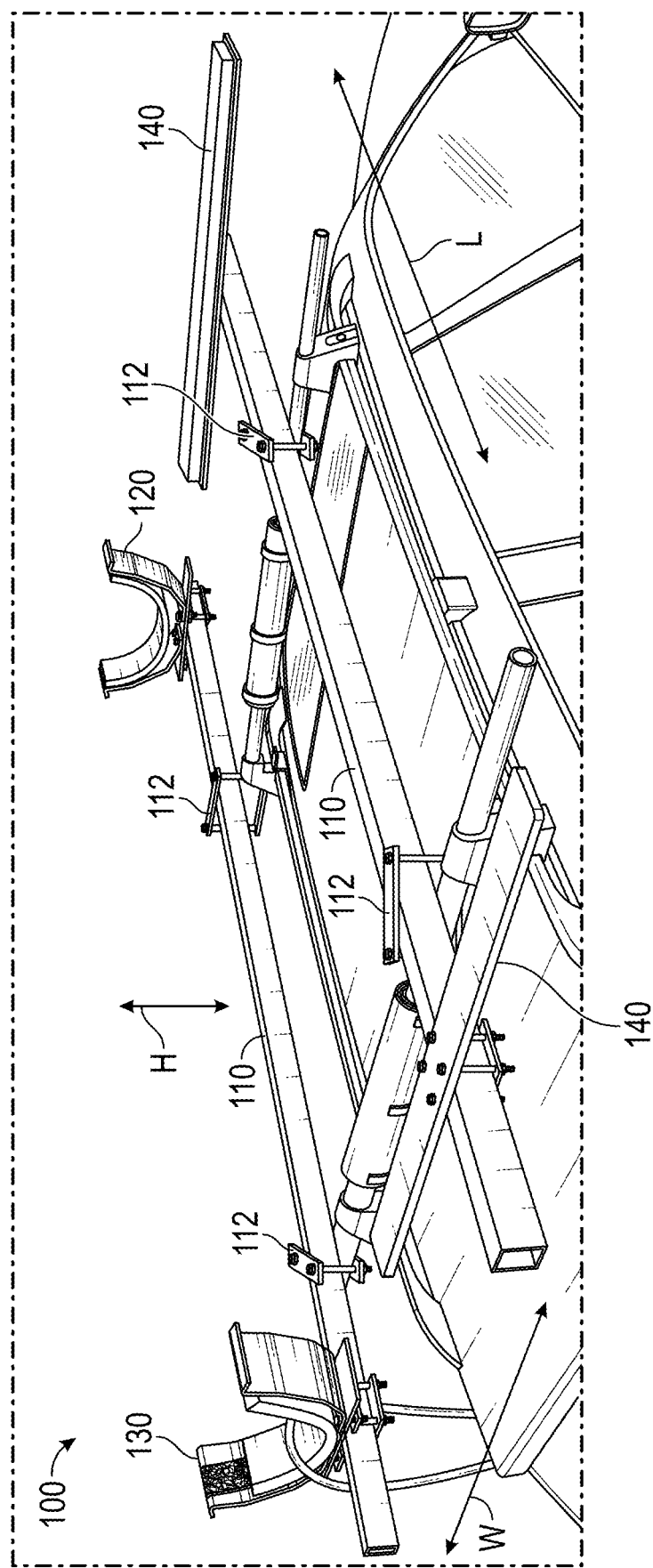
FIG. 1 is a first perspective view of embodiments of systems in accordance with aspects of the present disclosure.

For purposes of illustration, and not limitation, an illustrative, non-limiting example of a rack system 100 for securing articles is presented in FIG. 1. While the embodiments in the figures are illustrated for use with respect to personal watercraft, such as paddle boards, canoes, crew shells, surf skis and kayaks, it will be appreciated that the disclosed embodiments are suitable for use with any cumbersome elongate objects, particularly if they are fragile or easily damaged. Also, even though the disclosed rack systems are illustrated as being used on top of a vehicle roof rack, it will be appreciated that the rack system can be used on carts, trailers in applications for moving articles, as well as be used in stationary storage applications, such as inside garages and storage buildings, or out in the open so as to resist wind forces and the like. While the illustrated embodiments include structural components and mechanical fasteners formed from aluminum alloy, it will be appreciated that different materials can be used, such as other metals, plastics, and the like, and that the cross sectional shape of each of the structural members can be varied as desired depending upon the application for the system.

Figure 26:
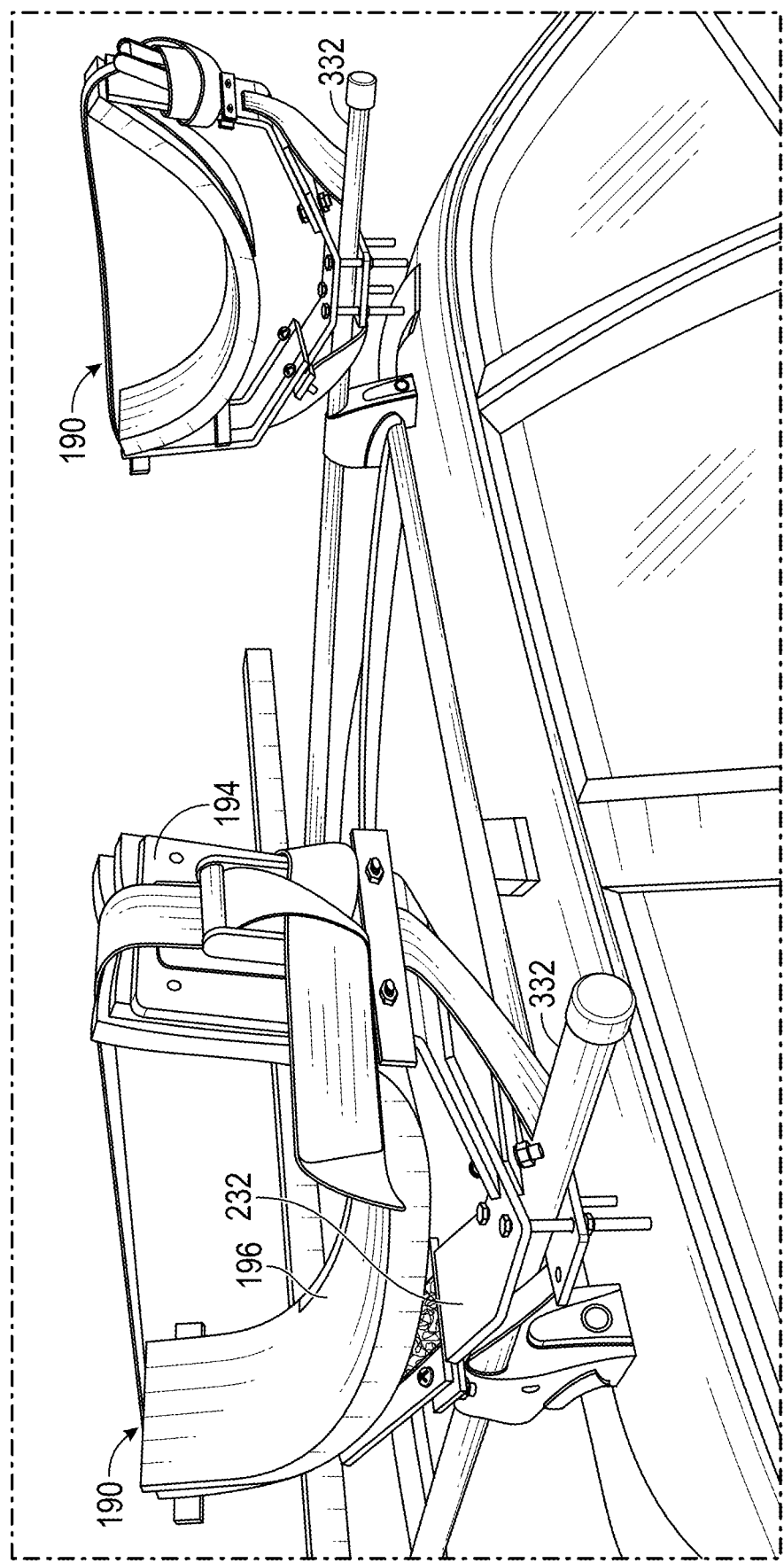
FIG. 26 is a perspective view of two brackets as illustrated in FIG. 25 mounted to lateral rails of a roof rack system.

With continuing reference to FIG. 1, a system (100) for securing articles can include a longitudinal elongate rail (110) traversing a longitudinal direction. The longitudinal rail can be a part of a system that is added to an existing roof rack. Alternatively, the elongate rail can be a portion of a native roof rack, as illustrated in FIG. 26. FIG. 1 illustrates two mounting systems 100, wherein each includes an elongate rail 110 removably attached to lateral cross-members of a roof rack of a vehicle. Elongate rails 110 are held in place by shackles, or clamps 112, that are formed from two metallic plates that surround the rail 110 and native cross-member, including bores that accommodate bolts that can be tightened to urge the plates toward each other and hold the rails 110 in place. While a simple universal clamp 112 is illustrated, it will be appreciated that any suitable clamp can be used. As further illustrated in FIG. 1, relative directions of length, or lengthwise "L", width, or lateral dimension "W" and height "H" are also illustrated. The longitudinal elongate rail 110 can act as or otherwise define a longitudinal track to permit the lateral rail to slide along the longitudinal direction.

As further illustrated in FIG. 1, each system 100 includes a bracket assembly (120, 130, 140) that receives an article to be mounted.

Figure 2:
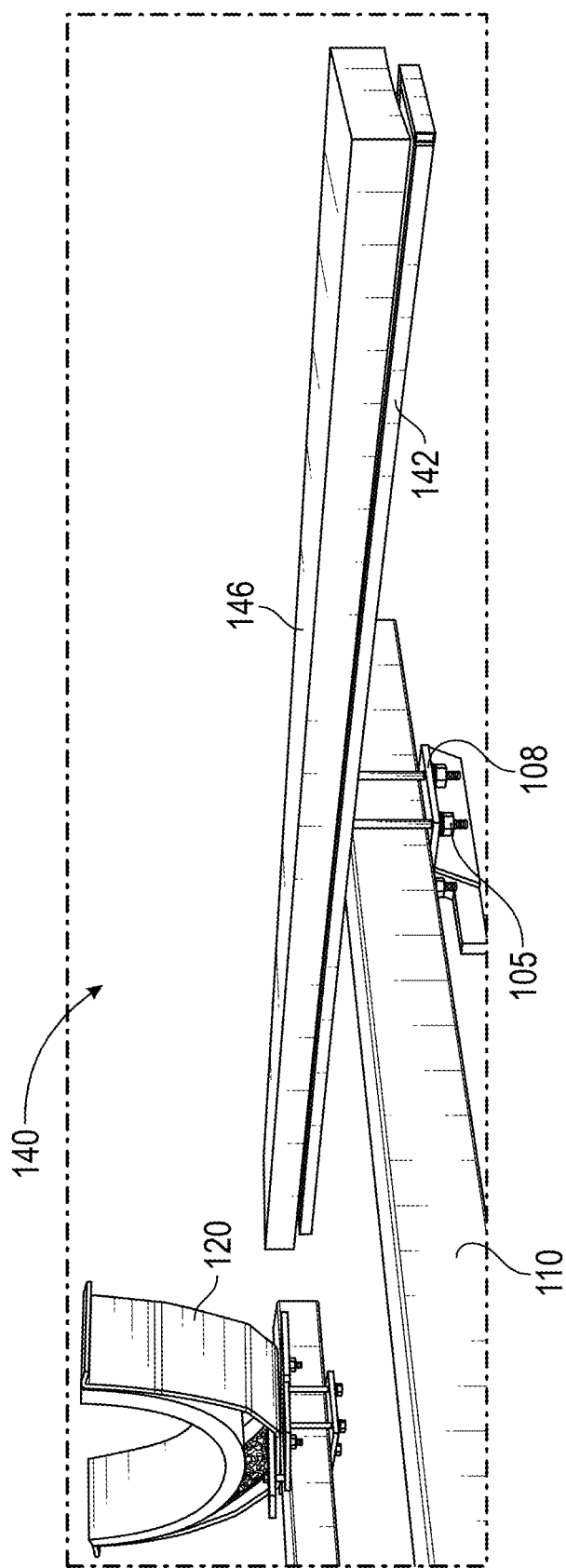
FIG. 2 is an enlarged view of a portion of the embodiments of FIG. 1.

With reference to FIG. 2, bracket assembly 140 is flat and simple in design and is configured to receive a paddleboard thereon (and held in place, for example, by a strap and/or elastic cord). Bracket assembly 140 includes a flat structural plate 142 made, for example, from aluminum bar stock or other suitable material. Plate 142 can be provided with a strip of padding 146 made, for example, of foam rubber. Padding 146 may be permanently attached (e.g., via adhesive) or removably attached to plate 142 via hook and loop fastener, snaps, mechanical fasteners, or the like. Padding can be removably attached to an inner surface of the upwardly extending bracket(s), the lateral rail, or a strap or sling that is used to hold the article in place within the system. The pad(s) can be shaped and positioned to conformably receive a portion of the article being stored or transported in any of the disclosed embodiments.

Brackets 120, 130 are more complex and adjustable and are configured to at least partially surround an article being secured to the system 100. Each of brackets 120, 130 includes a lateral rail (122, 132) that is in turn attached to elongate rail 110 by a clamp arrangement that includes a lower plate 108 having (e.g., four) holes bored therethrough to accommodate fasteners that also pass through the lateral rail. While a clamping arrangement can be used to hold lateral rails 122, 132 in place with respect to elongate rails 110, other arrangements can be used as desired. For example, lateral rails 122, 132 could include a sleeve attached thereto that slides over the elongate rail or may be bolt-able or otherwise directly attachable to the elongate rail 110 by way of threaded fasteners or the like.

Figure 3:
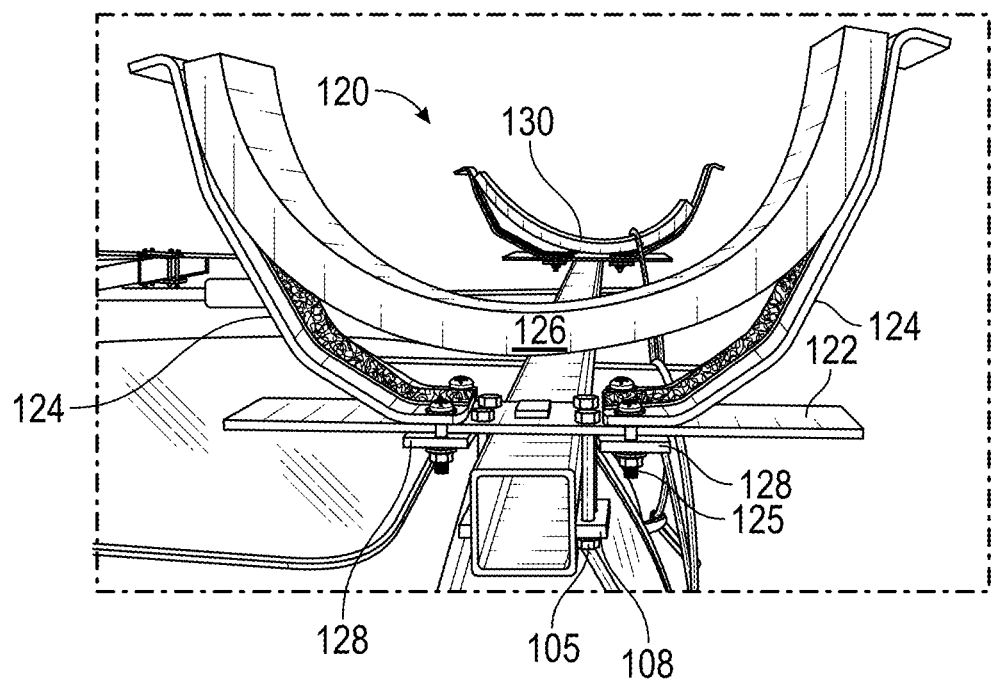
FIG. 3 is an end view of an embodiment in accordance with the present disclosure.
Figure 4:
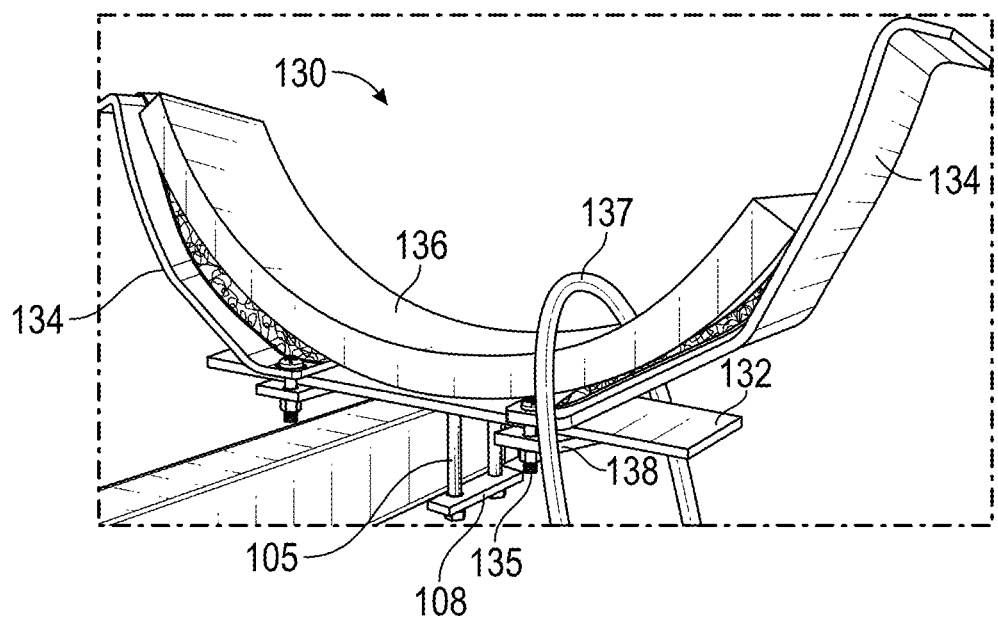
FIG. 4 is an end view of a further embodiment in accordance with the present disclosure.

With reference to FIGS. 3 and 4, brackets 120, 130 are illustrated. Each of brackets 120, 130 include a lateral rail 122, 132 in the form of a flat plate that is bolted to the elongate rail 110, as described above. Each of brackets 120, 130 further includes a pair of upwardly extending brackets, or arms 124, 134. Bracket 124 includes a first, lower horizontal portion that transitions into a first angled planar portion that transitions into second and third angled portions, and finally terminates in a bent over flange. Bracket 134 also starts with a horizontal flat segment, and includes two angled panels that then terminates in a bent over flange. Alternatively, each of brackets can be formed by one or more curved segments that may be of constant or changing radius. Brackets 124, 134 are attached to rails 122, 132 by frictional fit attributable to a clamp formed by plates 128, 138 including bore holes that receive bolts 125, 135 therethrough. Bolts 125, 135 are received by bore holes defined through brackets 124, 134. The width of plates 128, 138 can be the same as that of brackets 124, 134, as illustrated. Thus, the lateral rail 122, 132 can be narrower in width than the upwardly extending bracket(s) 124, 134 to permit lengthwise edges of the brackets 124, 134 to overlap and pass beyond lengthwise edges of the lateral rail 122, 132 to permit the components to be slid over one another. However, it will be appreciated that the system can be configured such that the lateral rail 122, 132 can be wider than or the same width as the upwardly extending bracket(s) 124, 134. As illustrated, the lateral rail 122, 132 can act as or otherwise define a lateral track to permit the upwardly extending bracket(s) 124, 134 to slide along the lateral direction so they can move away from or toward one another along the lateral rail. While the lateral rails 122, 132 can be orthogonally oriented with respect to the longitudinal elongate rail 110, they can alternatively be obliquely oriented with respect to rail 110, if desired. The lateral rail 122, 132 can be configured to be mounted at a plurality of longitudinal positions along the longitudinal rail 110.

Figure 5:
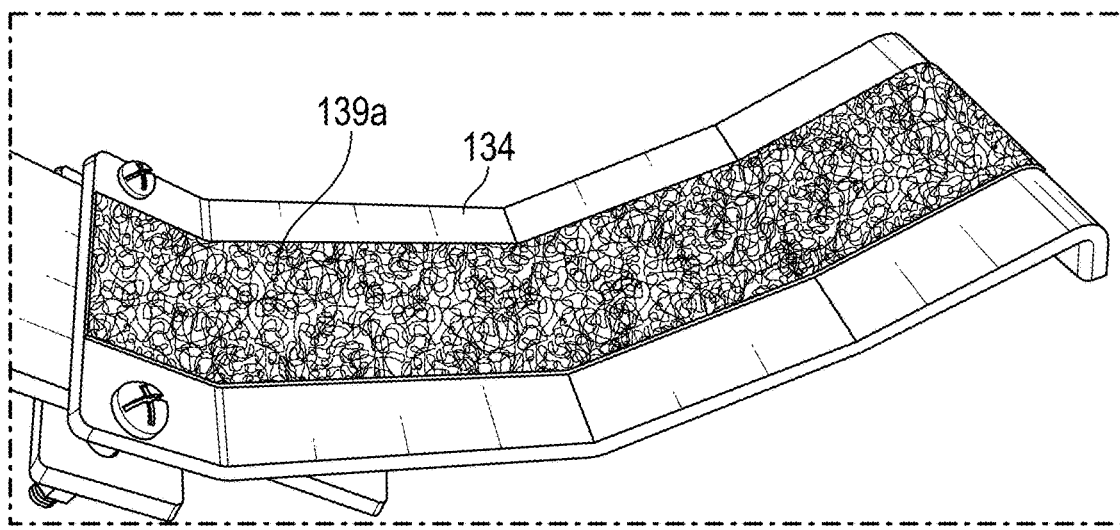
FIG. 5 is a perspective view of an upwardly extending bracket in accordance with the present disclosure.
Figure 6:
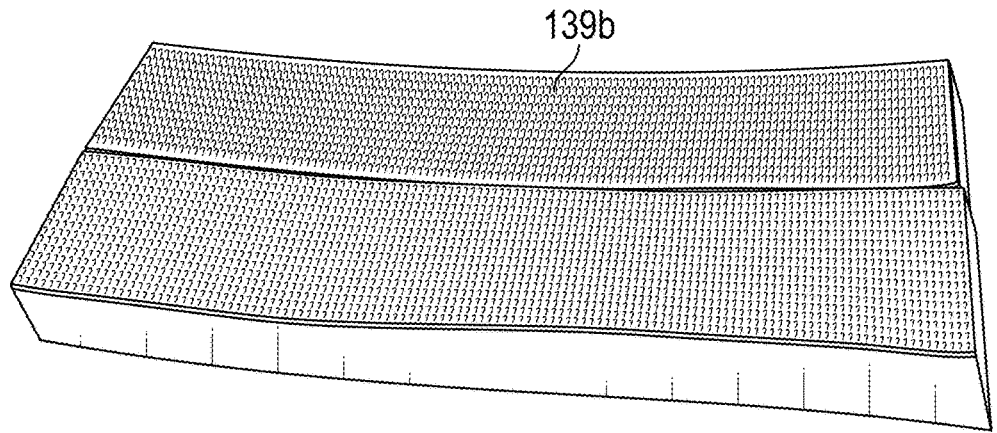
FIG. 6 is a bottom view of a pad in accordance with the present disclosure including a fastener attached thereto.
Figure 7:
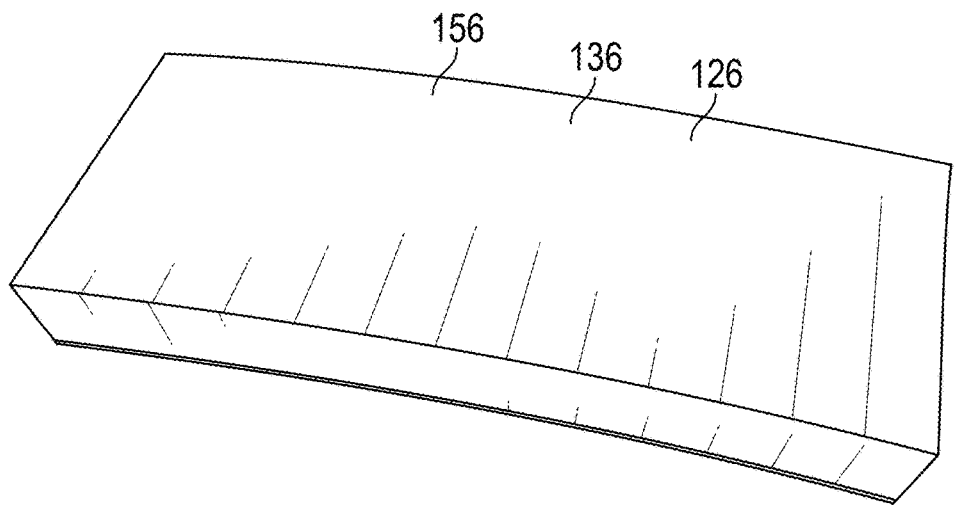
FIG. 7 is a top view of the pad of FIG. 6.

As further illustrated in FIGS. 3 and 4, padding 126, 136 can be (and preferably is) included in the bracket 120, 130 to help cushion any article being transported using system 100. As illustrated, padding 126, 136 is an elongate compliant material, such as foam rubber or the like. As illustrated, the padding 126, 136 may be rectangularly-shaped and have a rectangular cross section so as to match the general dimensions of the bracket 120. Padding 126, 136 can be permanently attached to the brackets 120, 130. Preferably, and with reference to FIGS. 5, 6 and 7, padding 126, 136 is removably attached to the brackets 124, 134, and if desired, to the lateral rail 122, 132 by snaps or hook and loop fastener 139*a* (FIG. 5) and 139*b* (FIG. 6), for example. The padding can follow the surface of the bracket such as with bracket 130 such that the padding is generally in contact with the structure of the bracket 130 along its length as illustrated in FIG. 4. Alternatively, as illustrated in FIG. 3, the padding 126 can be connected at its ends to the upper portions, for example, of brackets 124 and be suspended therebetween to form a cradle that can conform to the shape of whatever article is being carried, such as a rounded crew shell hull. An elastic cord 137 or other strapping can be used to hold an article in place in cradle 120, 130 by placing the article in the cradle and looping the elastic cord or strap over the article and under the upper bent flanged ends of each of the brackets 124, 134.

Figure 8:
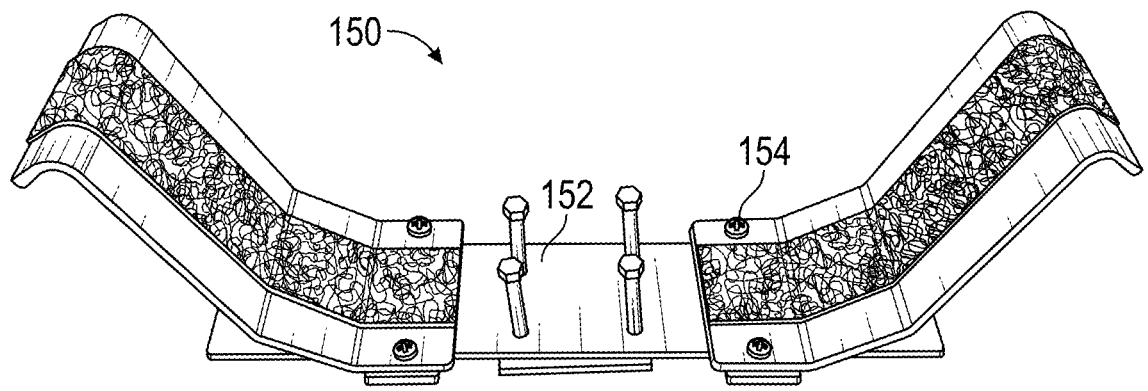
FIG. 8 is a perspective view of a portion of a mounting system in accordance with the present disclosure.
Figure 9:
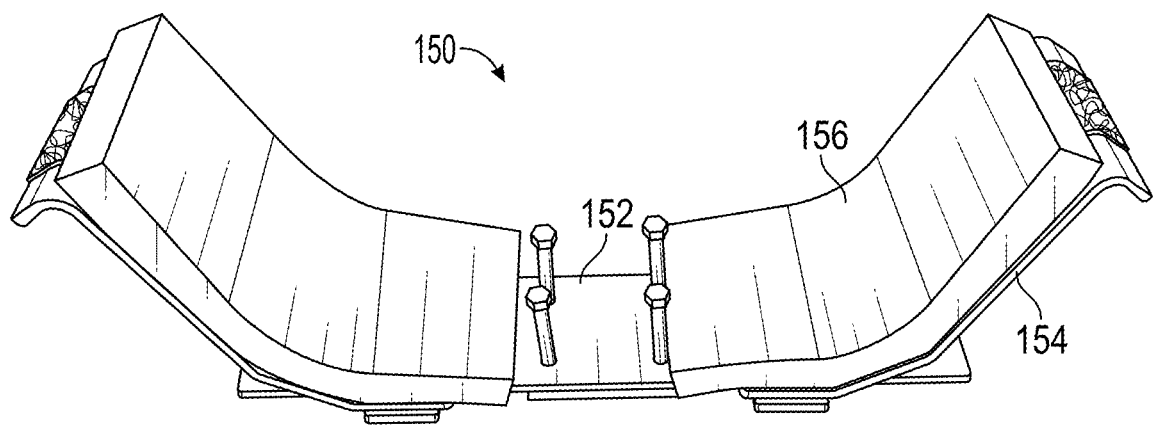
FIG. 9 is a perspective view of the embodiment of FIG. 8 having padding removably attached thereto.

FIG. 8 illustrates a further embodiment of a bracket assembly 150 that includes a linear lateral rail 152 similar to rails 122, 132 and brackets 154 that include a first, lower flat portion that abuts rail 152, which transitions into two flat angled portions and terminates in a bent over flange. FIG. 9 illustrates bracket 150 having pads 156 removably attached thereto by way of hook and loop fastener.

Figure 10:
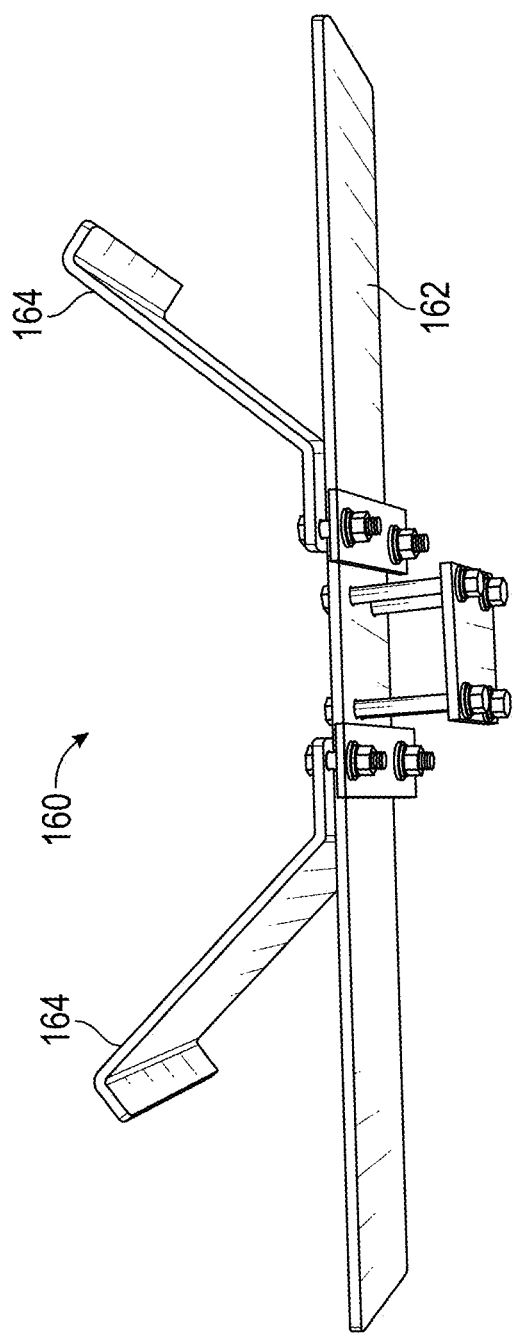
FIG. 10 is a bottom perspective view of a further embodiment of a mounting assembly in accordance with the present disclosure.
Figure 11:
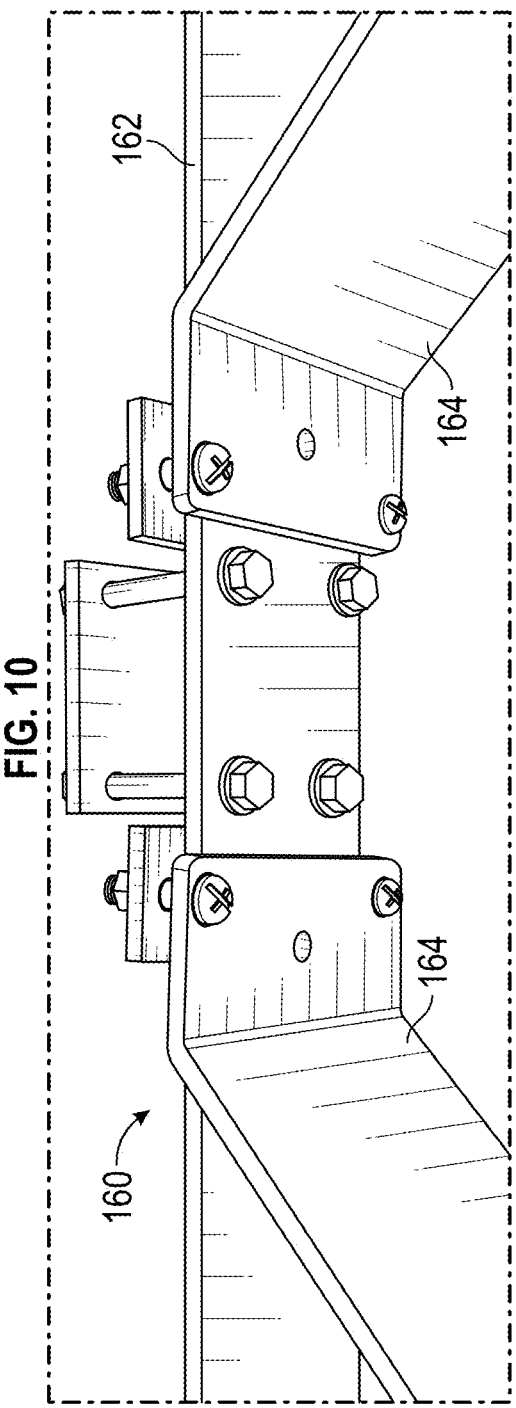
FIG. 11 is an enlarged top perspective view of a portion of the embodiment of FIG. 10.

FIGS. 10 and 11 illustrate a further embodiment of bracket assembly 160 that in turn includes a linear lateral rail 162 that includes a clamp for attaching the lateral rail 162 to elongate rail 110. Assembly 160 further includes angled upwardly extending brackets 164. Each of brackets 164 includes a flat lower horizontal portion that is clamped to the lateral rail 162, a second angled portion (that may be straight or curved) that terminates in a bent over flange.

Figure 12:
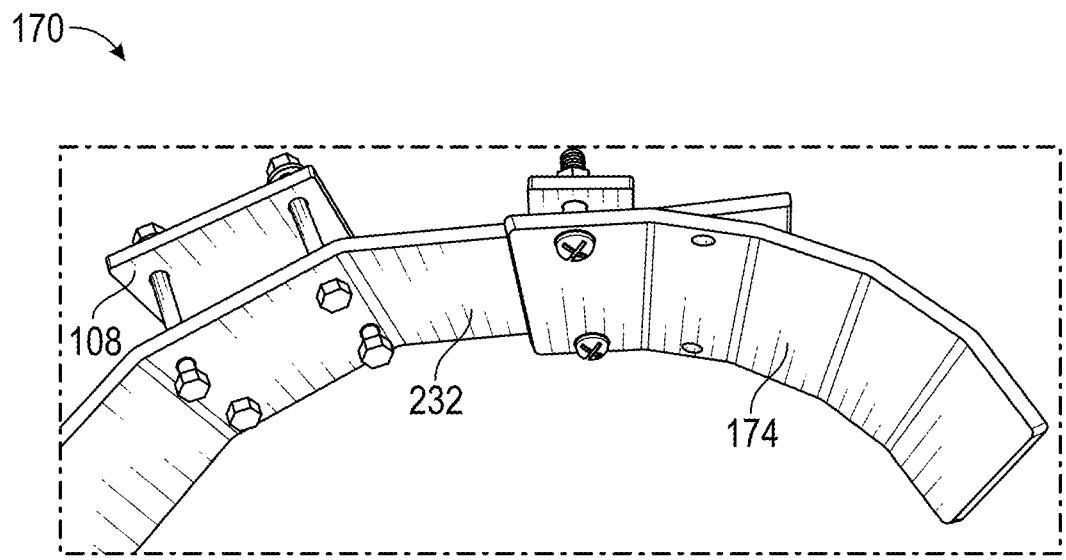
FIG. 12 is a top perspective view of a further embodiment of a mounting assembly in accordance with the present disclosure.
Figure 13:
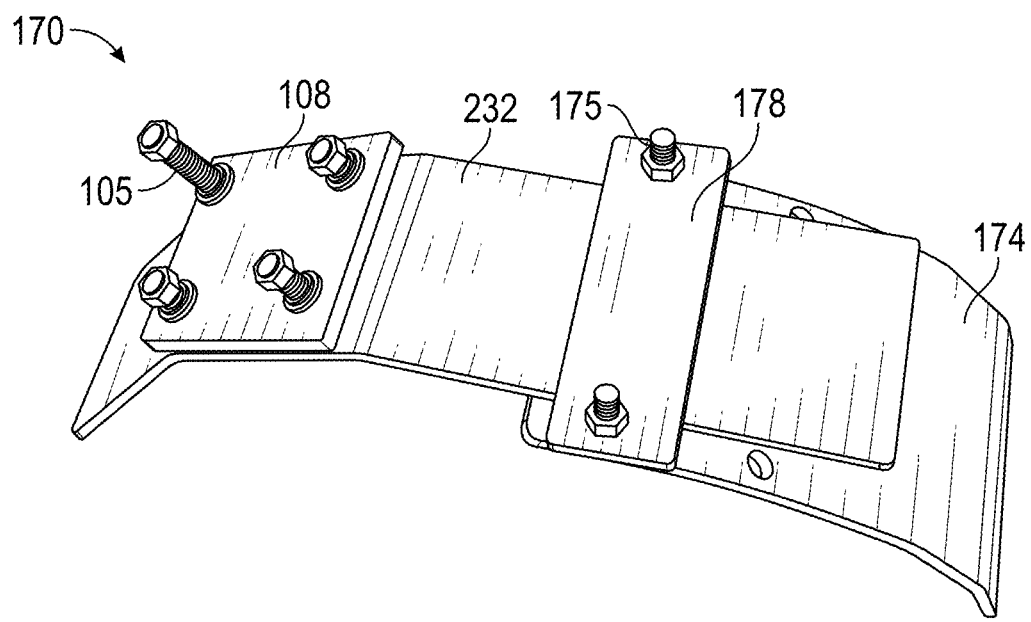
FIG. 13 is an enlarged bottom perspective view of a portion of the embodiment of FIG. 12.

FIG. 12 is a top perspective view of a further embodiment of a mounting assembly 170 in accordance with the present disclosure. FIG. 13 is an enlarged bottom perspective view of a portion of the embodiment 170 of FIG. 12. As illustrated, assembly 170 includes a lateral rail 232 that includes angled wing portions rather than being straight. Alternatively, rail 232 could include gently curved wings. Brackets 174 (or any other such bracket disclosed herein) is bolted to rail 232 in a fashion similar to bracket assemblies 120, 130 using a clamping arrangement. Bracket 174 includes a lower horizontal portion that contacts rail 232, and four progressively angled portions that terminate in a tip rather than a bent over flange as with the previous embodiments. In further implementations, all embodiments of brackets (124, 134, 154, 164) can omit the outer bent over flange to facilitate use of a strap attachment system discussed in further detail below with reference to FIGS. 19-26.

Figure 14:
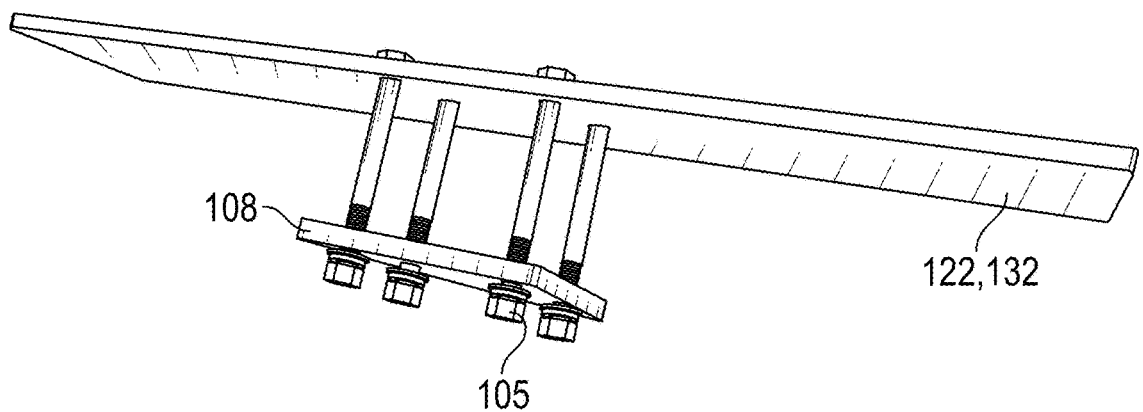
FIG. 14 is a bottom perspective view of a first embodiment of a lateral rail in accordance with the present disclosure coupled to a mounting bracket.
Figure 15:
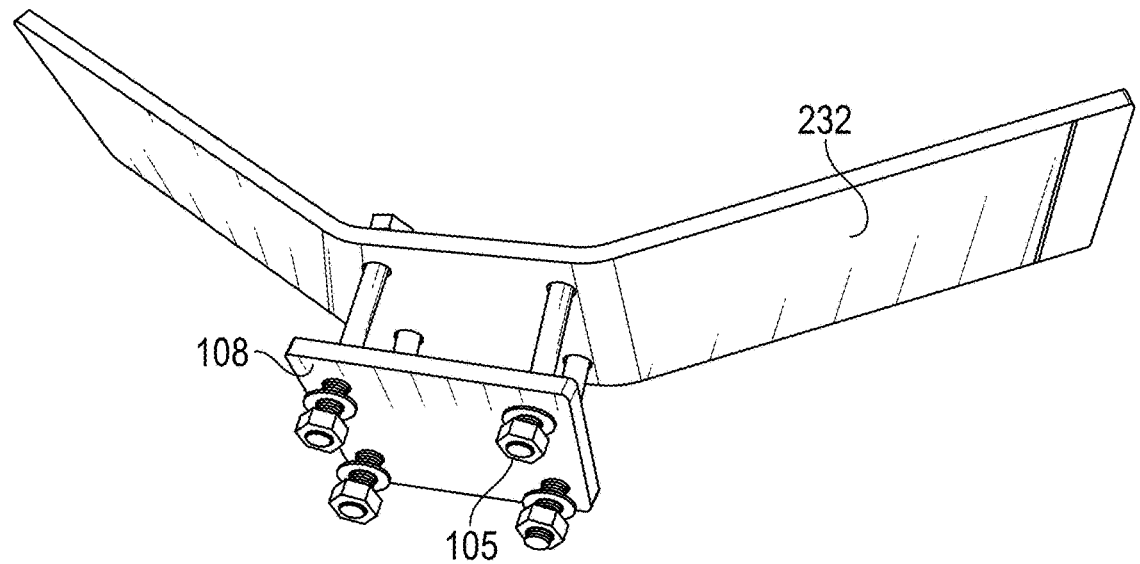
FIG. 15 is a bottom perspective view of a second embodiment of a lateral rail in accordance with the present disclosure coupled to a mounting bracket.
Figure 16:
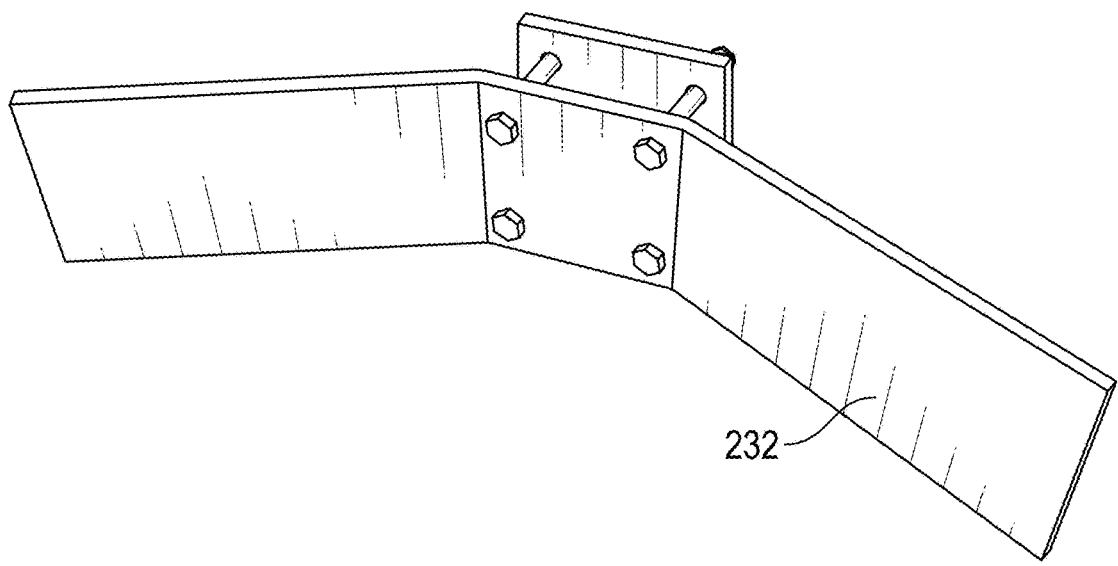
FIG. 16 is a top perspective view of the embodiment of FIG. 15.
Figure 17:
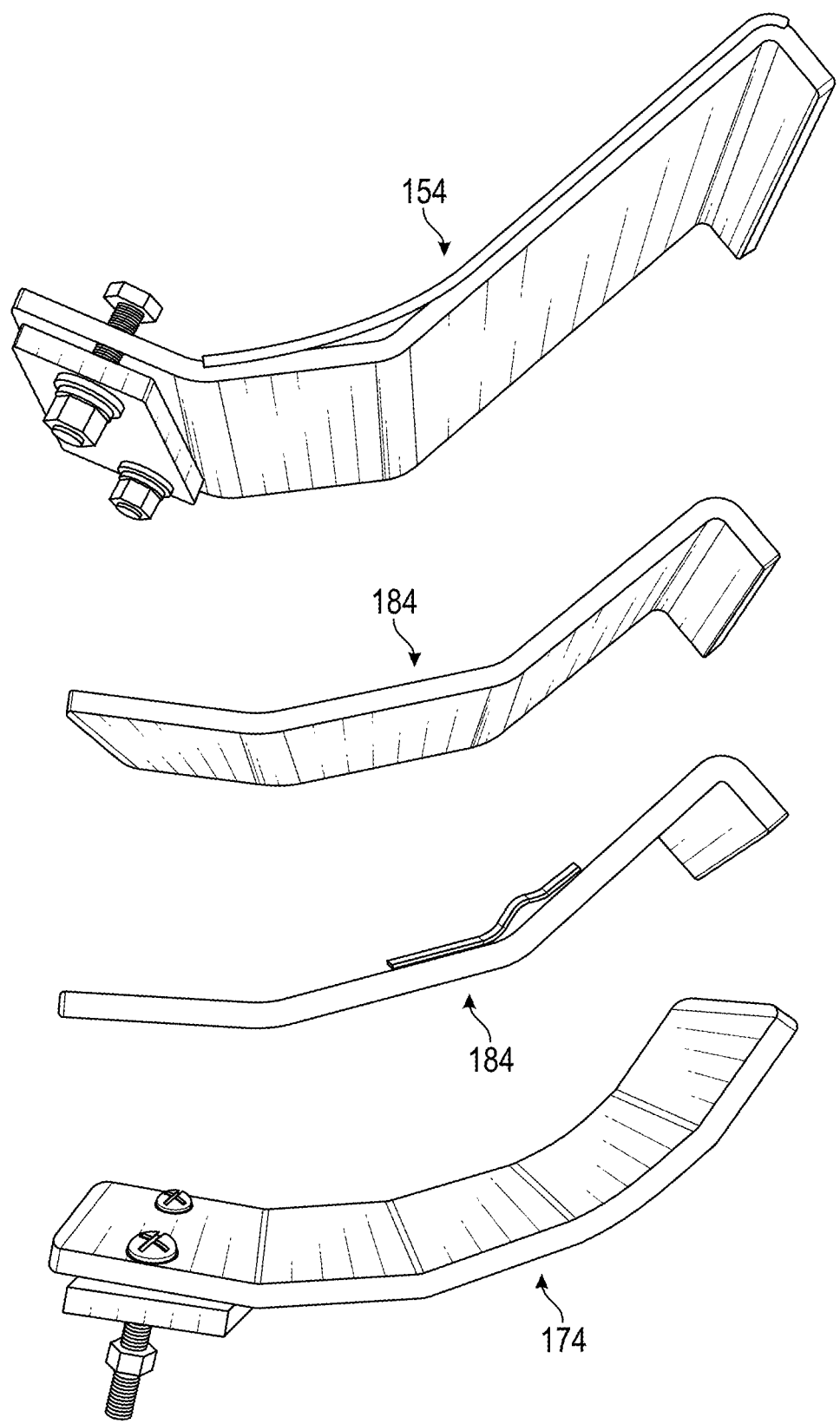
FIG. 17 is a perspective view of different embodiments of various embodiments of upwardly extending brackets in accordance with the present disclosure.

Lateral rail 132 can be attached to elongate rail 110 in a similar manner as previous embodiments using the illustrated clamping arrangement. Lateral rail 232 is illustrated in further detail in FIGS. 15 and 16, while the linear rail 122, 132 is illustrated in FIG. 14. FIG. 17 illustrates the various embodiments of upwardly extending brackets 154, 174 and 184, wherein the latter includes a lower portion that is attached to the lateral rail, and two shallowly bent portions terminating in a bent over flange for holding an elastic cord or belt in place to help retain an article in the bracket.

FIGS. 18 to 26 present a further embodiment of a bracket 190 in accordance with the disclosure. This embodiment omits the bent over flanges of the upwardly extending brackets of previous embodiments and instead utilizes brackets 192 at the upper ends (or any other location) along brackets 190 for the routing of elastic cords, or for holding sling webbing in place, discussed in further detail below.

Figure 18:
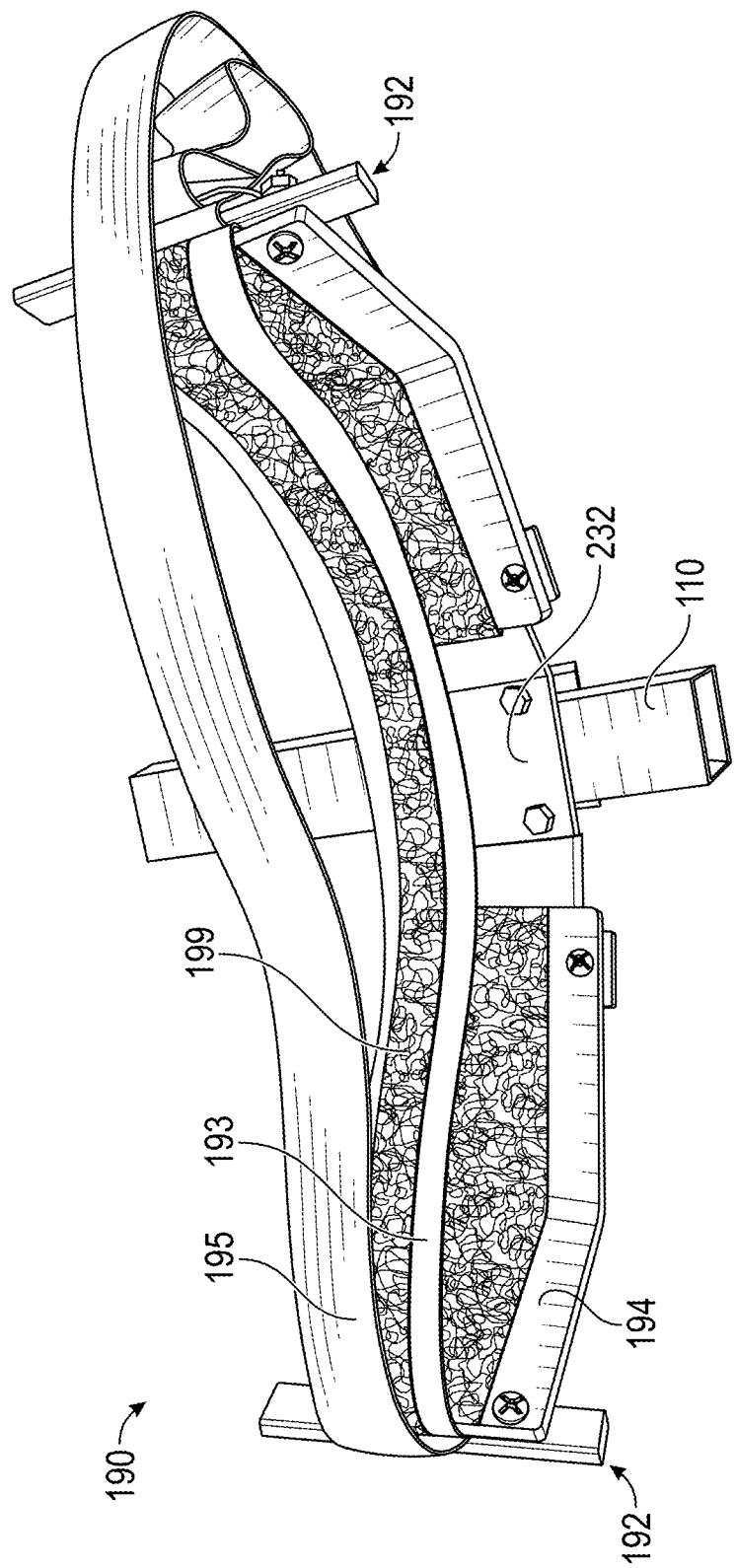
FIG. 18 is a perspective view of a further embodiment of a mounting system in accordance with the present disclosure including modified upwardly extending brackets, webbing and a circumferential strap in accordance with the present disclosure.
Figure 19:
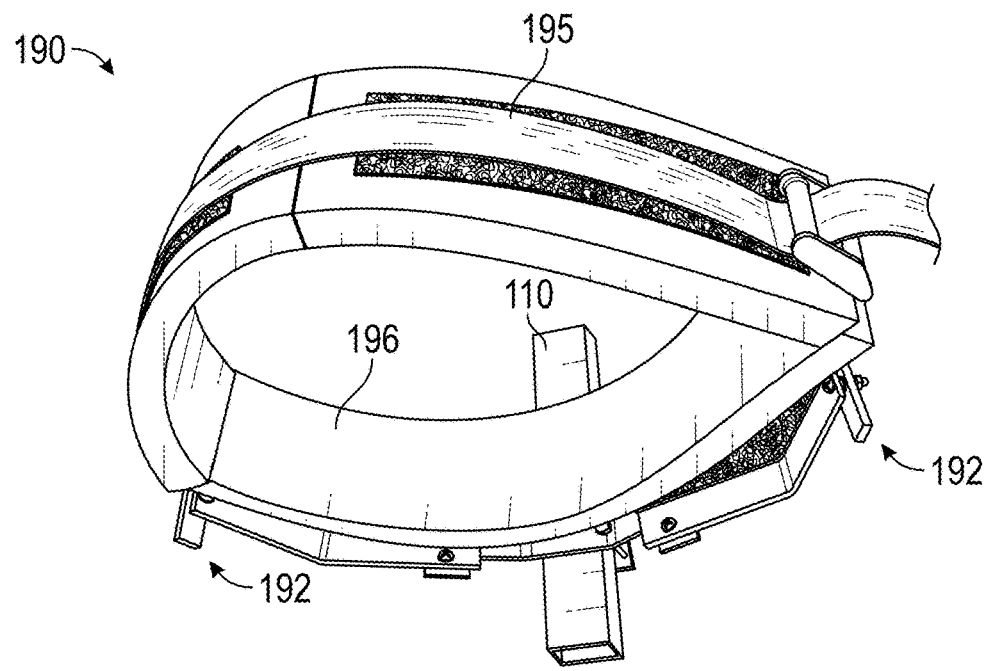
FIG. 19 is a perspective view of the mounting system of FIG. 18 with removable padding installed.

With reference to FIG. 18, bracket 190 is illustrated without padding installed. A strip of webbing 193 is added that is suspended across the expanse of the bracket arms 194, held in place by way of a frictional fit between an outer upper surface of bracket 194, and an inner face of bracket 192 that are bolted together, holding webbing 193 tightly in place. Webbing 193 can include a strip of hook and loop fastener as illustrated (or other fastener) to receive padding 196 (FIG. 19) that can be provided with complementary hook and loop fastener, snaps, or the like. A strap 195 is also routed between the clamping portions of brackets 194 and 192, as well as under brackets 194 (and lateral rail 232, if desired) so as to fully surround the bracket 190 as well as any article placed inside of the bracket 190. An inner surface of the upper portion of strap 195 can be provided with hook and loop fastener (not shown) in order to provide a securement surface for padding 196, as illustrated in FIG. 19. FIG. 18 illustrates the underlying structure of bracket 190 and FIG. 19 shows the structure with the padding 196 in place. If desired, and as illustrated, the padding 196 can surround the opening defined by the bracket 190, and any article placed in the bracket, which can be important for expensive watercraft such as crew rowing shells.

Figure 20:
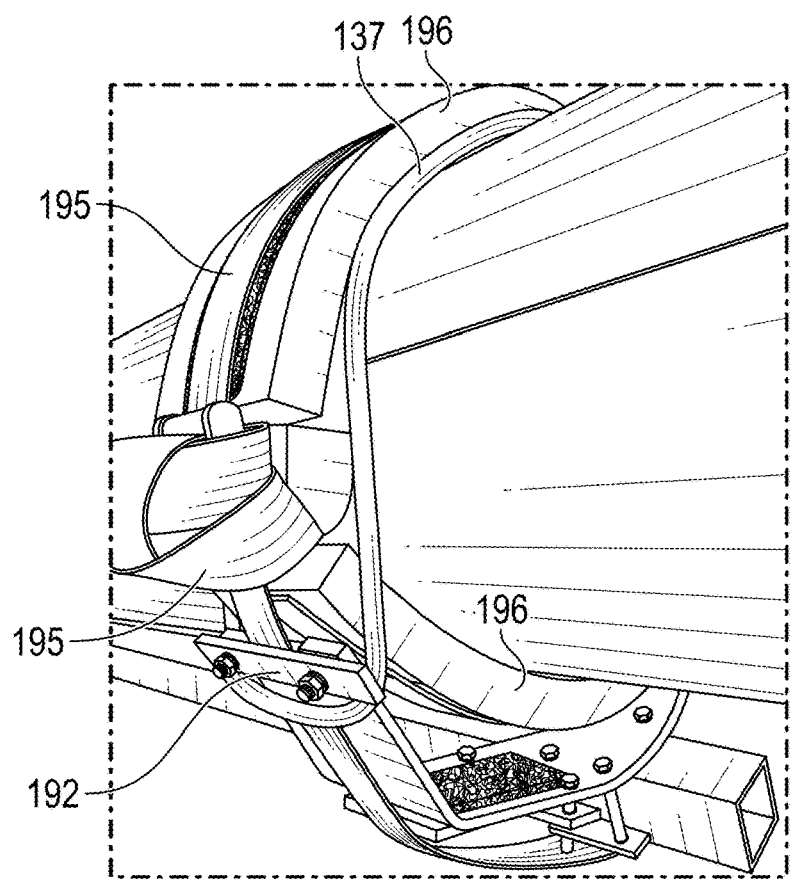
FIG. 20 is a perspective view of a first end portion of the mounting system of FIG. 19 with a personal water craft mounted therein, illustrating the relative placement of components.
Figure 21:
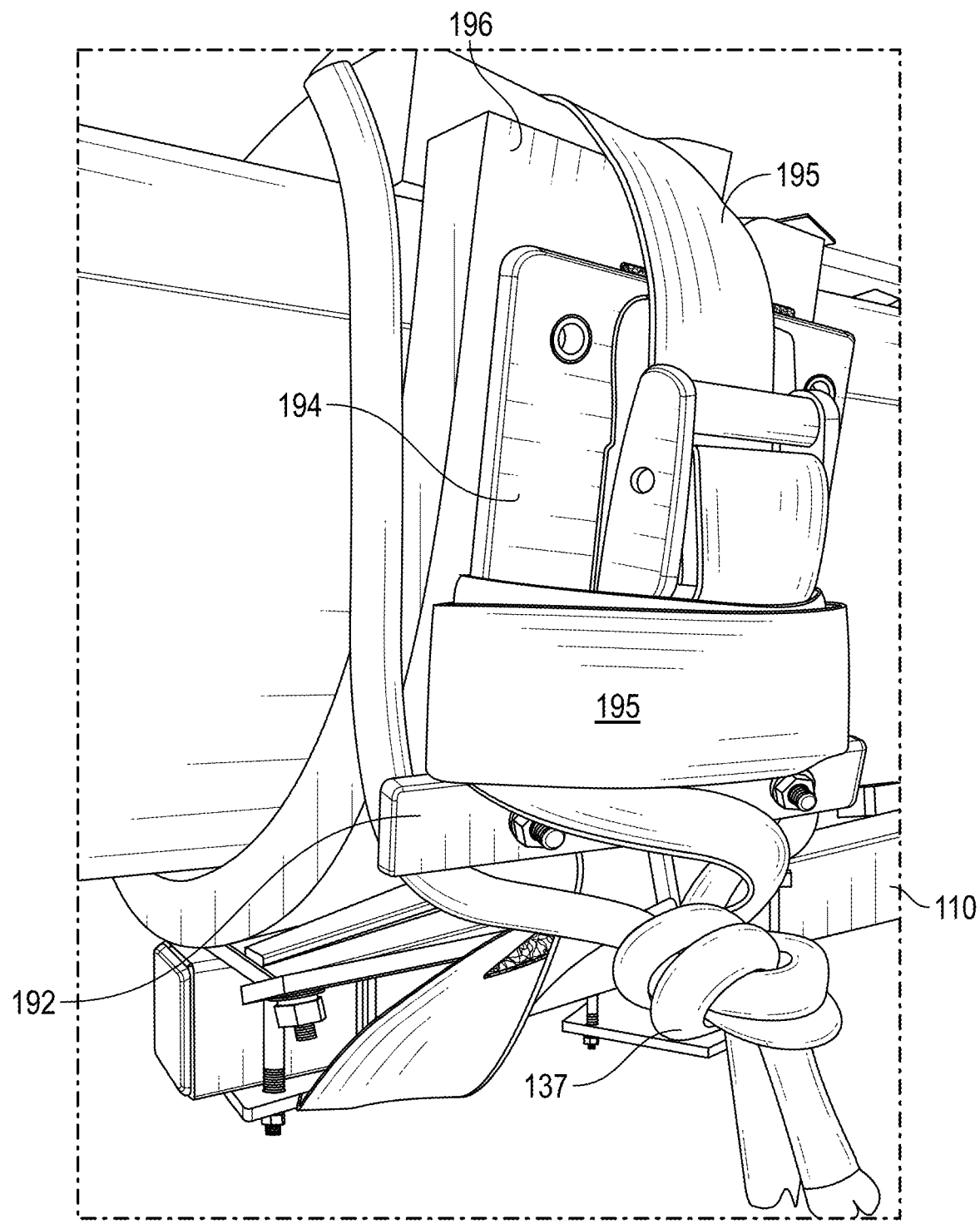
FIG. 21 is a perspective view of a second end portion of the mounting system of FIG. 19 with a personal water craft mounted therein, illustrating the relative placement of components.
Figure 22:
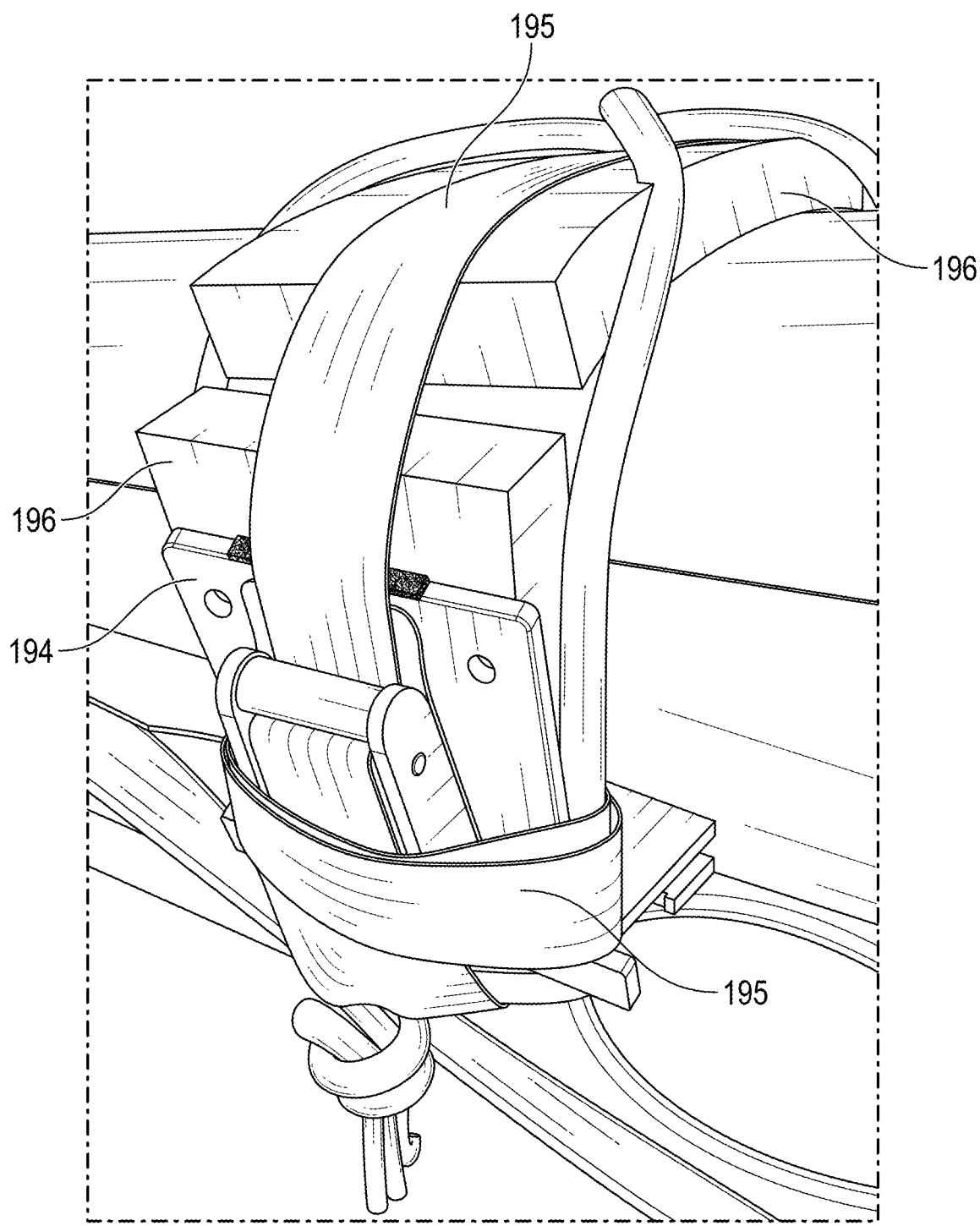
FIG. 22 is a top perspective view of the second end portion of the mounting system of FIG. 19 showing the relative placement of components.

FIG. 20 is a perspective view of a first end portion of the mounting system of FIG. 19 including bracket assembly 190 with a personal water craft mounted therein, illustrating the relative placement of components. FIG. 21 and FIG. 22 are a bottom perspective view and a top perspective view of a second end portion of the mounting system of FIG. 19 with a personal water craft mounted therein, illustrating the relative placement of components on the other side of the boat.

As illustrated in FIG. 20, an article such as a personal watercraft is held in place by the components of the bracket assembly on the roof of a vehicle via attachment to a roof rack. The article rests on padding 196 that in turn rests on webbing 193 that is supported by two upright brackets 194 as described above. A clamp is formed by cooperation between an upper edge of one of the brackets 194 and a plate 192 that are bolted together, which sandwich and compress webbing 193 that forms a sling under the personal watercraft to support a lower portion of the padding, as well as a lower portion of strap 195 that runs underneath the brackets 194, along the top of or underneath lateral rail 232 and terminates at an upper end at two buckles, one on each side of the bracket assembly. An elastic cord 137 formed into a loop can be directed under the ends of the plate 192 that extends beyond the width of the plate that forms bracket 194 on each side of the bracket assembly (see also FIG. 21). Padding 196 is in direct contact with the surface of the article around substantially its entire extent in order to provide maximum cushioning protection. FIG. 21 shows the same components on the other side of the bracket assembly. FIG. 22 shows the other side of the bracket assembly from a higher angle, more clearly showing padding passing over the top of the article.

Figure 23:
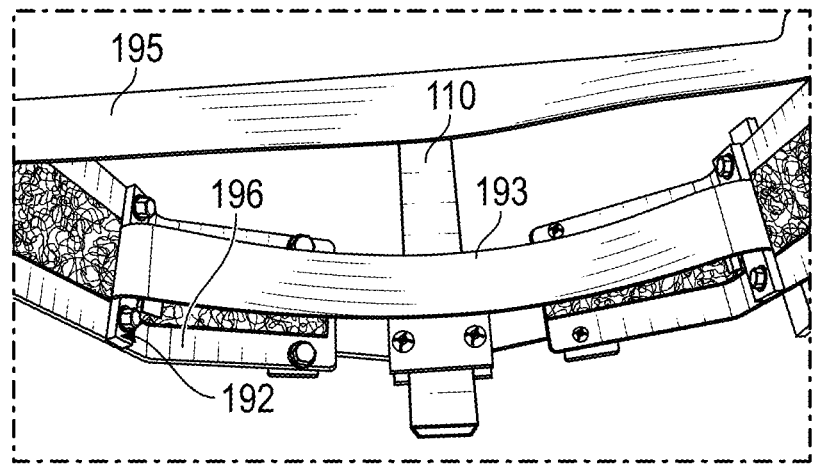
FIG. 23 is a further perspective view of the mounting system in accordance with the present disclosure including modified upwardly extending brackets, webbing and a circumferential strap in accordance with the present disclosure.
Figure 24:
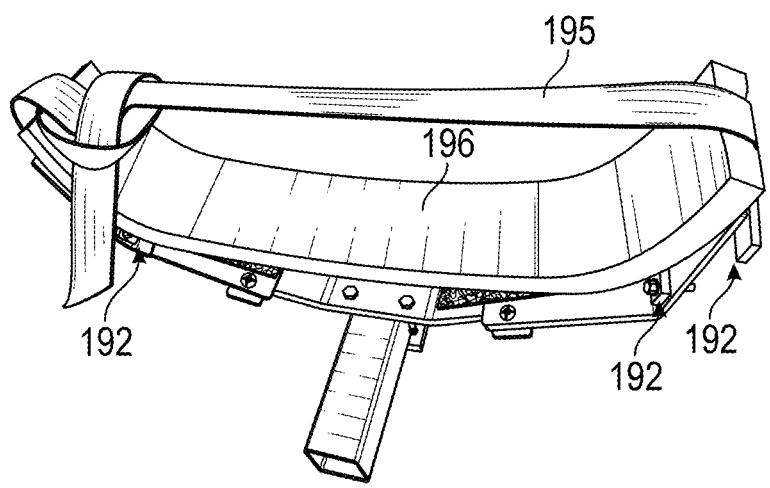
FIG. 24 is a perspective view of the mounting system of FIG. 23 with removable padding installed.
Figure 25:
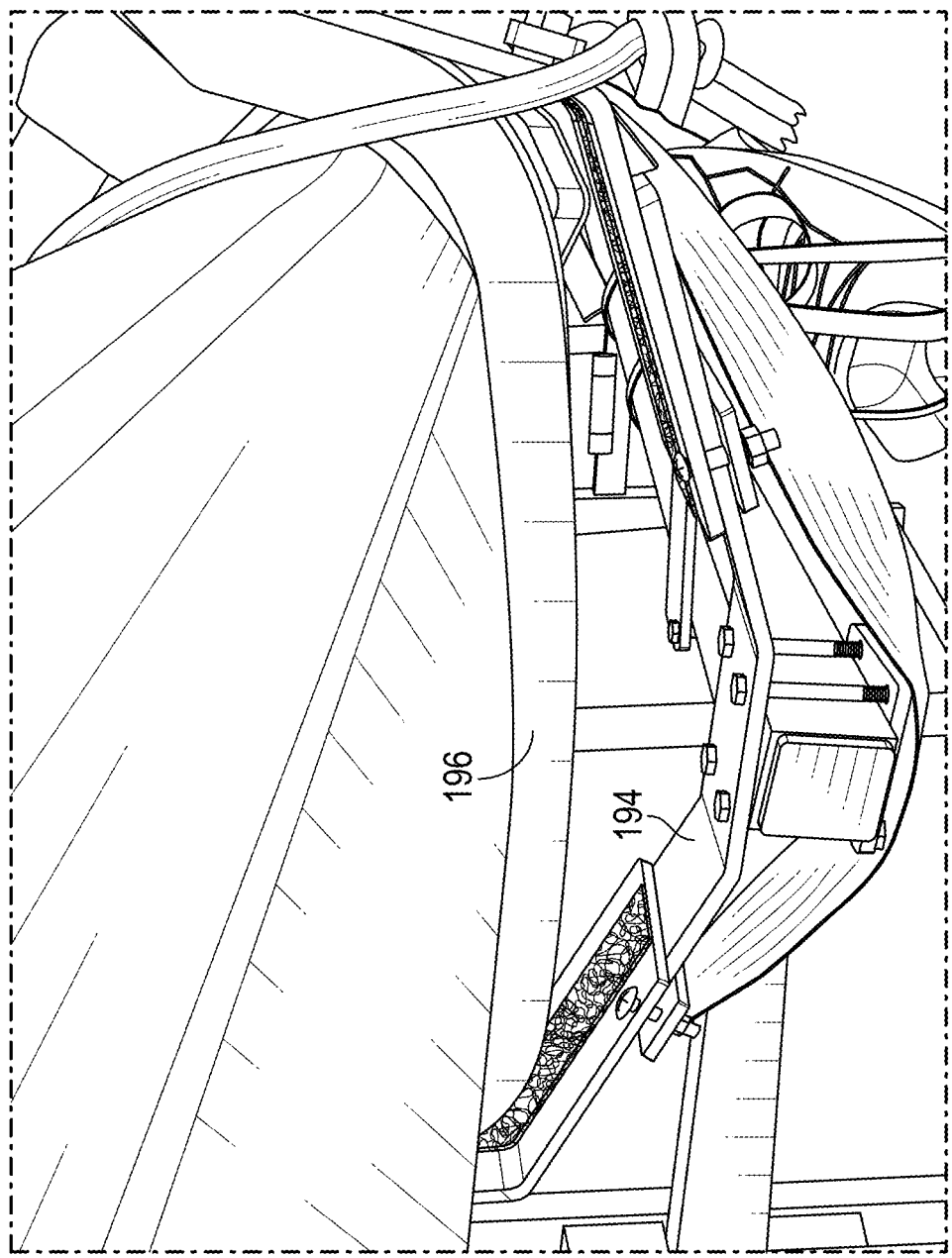
FIG. 25 is a bottom perspective view of the mounting system of FIG. 24 with a personal water craft mounted therein, illustrating the relative placement of components.

FIG. 23 is a variation on the previously described embodiment. While the overall structure and components used are the same, an additional set of plates 192 is added at a lower location along the brackets 194 near a bend about halfway along the extent of brackets 194 to form a second pair of clamps. Plates 192 are illustrated as being the same extent in length as the width of brackets 194, but plates may be longer or shorter as desired. Plates 192 are bolted to the inside of the brackets 194 at each end, and webbing 193 passes between the bolts of each bracket to form a lower sling that is suitable for supporting a flat object such as the top of a kayak or other personal watercraft, for example, as illustrated in FIG. 25. FIG. 23 shows the bracket assembly without padding (wherein hook and loop fastener is not illustrated as being added to webbing 193) and FIG. 24 shows the addition of padding 196 that is attached at either end of the padding to hook and loop fastener that is in turn attached to the inner faces of brackets 194. FIG. 25 shows a lower portion of the strap being directed beneath elongate rail 110 and underneath the upper clamps of the bracket assembly. Also present in FIG. 25 are the strap 195 and optional elastic cord 137 to hold the article secure in the supporting bracket assembly.

FIG. 26 illustrates the bracket assemblies 190 described above coupled to native lateral rails 332 of an existing roof rack system. The lateral rails 232 of the brackets 190 are thus parallel to the native rails 332. It will be appreciated that the adjustable bracket assemblies (e.g., 120, 130, 150, 160, 170, 180, 190) can be coupled or suitably modified to be coupled to existing roof racks or other storage or transport racks to enhance versatility.

While previous embodiments have been directed to bracket systems that are adjustable and removable from an elongate support, the present disclosure also provides V-brackets or U-brackets that are not adjustable, and may or may not be easily removed from an elongate support (e.g., 110).

Figure 27:
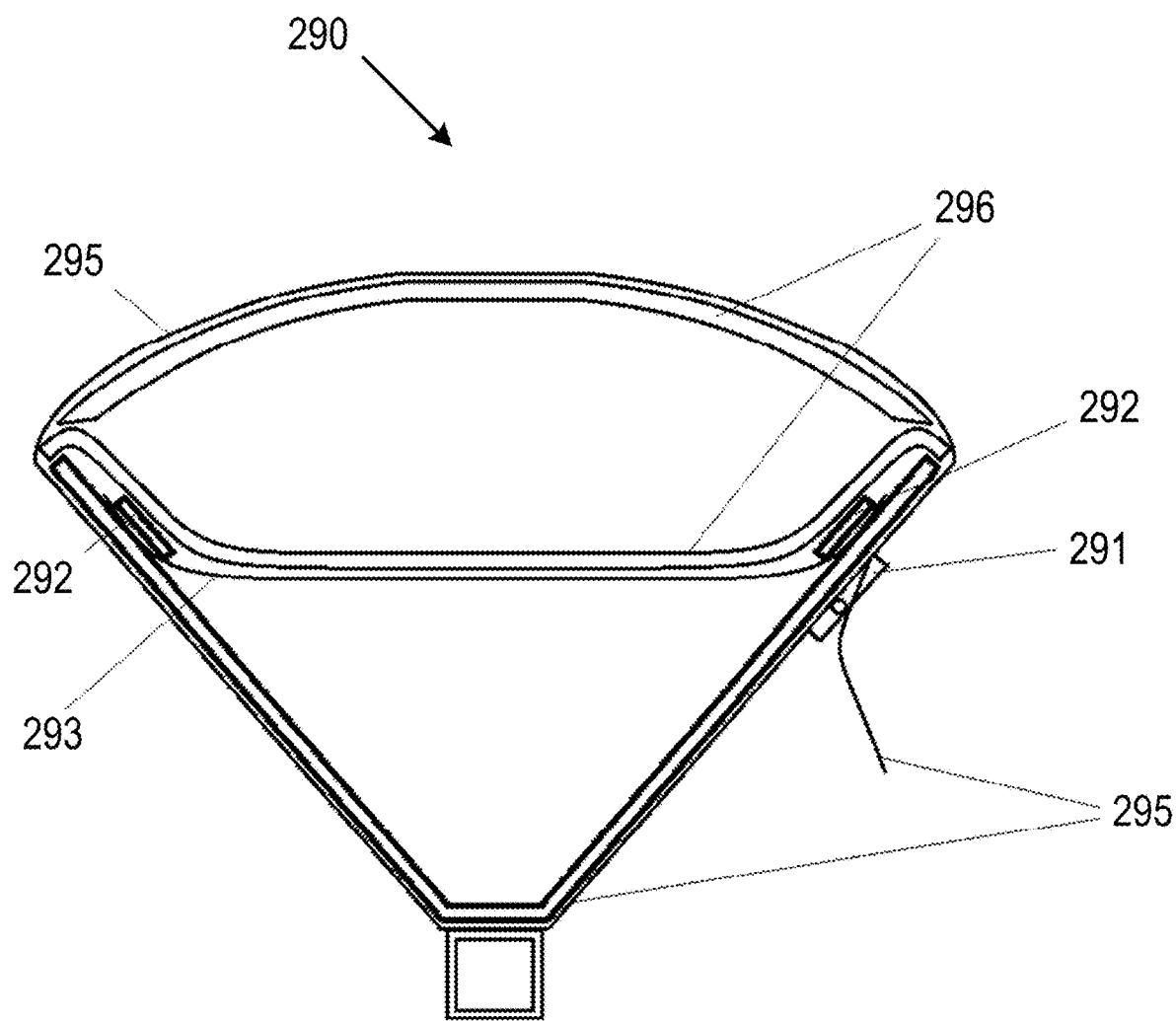
FIG. 27 is an end view schematic of a further embodiment of a mounting system in accordance with the present disclosure.

For purposes of illustration, and not limitation, FIG. 27 illustrates an end view of yet a further embodiment of a bracket assembly 290 in accordance with the present disclosure that includes a non-adjustable structural V-bracket bolted to an elongate rail (e.g., 110) that includes strap and clamping features very similar to embodiment 190. While the upwardly extending arms of the bracket are not adjustable, they include one or more plates 292 bolted thereto in a fashion similar to plates 192 being bolted to plates 194. Plates 292 may be longer, shorter or the same extent of the depth/width of the plates forming the V-bracket to form clamps to hold webbing 293 in place, wherein webbing 293 forms a compliant, flexible lower support for padding 296. A strap 295 can be directed around a lower face of the V-bracket and over or under the lower elongate rail (e.g., 110) and terminate in a free end that passes through a buckle 291. Alternatively, a buckle can be provided at each side as with the previously described embodiment. An upper section of padding 296 can be attached to a lower face of strap 295. Padding 296 can be permanently or removably attached as desired as with the previously described embodiments. If desired, the supporting webbing 293 can be removed, and the pad 296 can be suspended to form a cradle by attaching each end thereof to one of the upper inner faces of the V-bracket.

Figure 28:
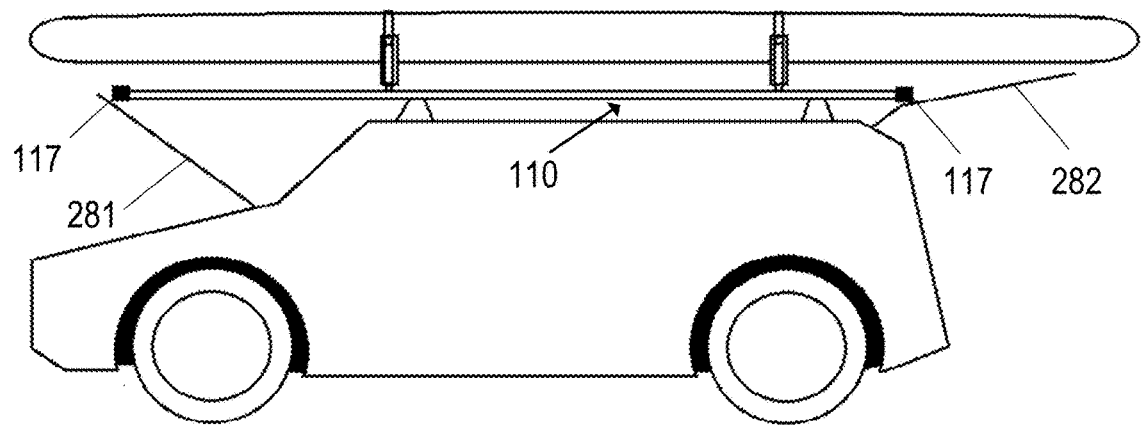
FIG. 28 is a side view of a vehicle having a mounting system in accordance with the present disclosure disposed on a top thereof.

FIG. 28 presents a side schematic view of a vehicle that includes a mounting system attached to a top thereof in accordance with the present disclosure. The hood 281 and rear hatch or trunk lid 282 may be opened without damage due to collision with the ends of elongate rail 110 by way of padded end caps 117 attached to the front and rear ends of the rail 110. Alternatively, the padding 117 can be attached to the bottom or under side of the rail 110 at any location along its length. The padding can be permanently attached, or detachable fasteners (e.g., snaps or hook and loop fastener) can be attached to each of the underside of the rail and the upper face of the pad to permit adjustable placement of the pad along the rail at a plurality of locations so any adjustments can be made on an as-needed basis. This is useful particularly if a user's hood, hatch or trunk opens in an area other than the bar ends.

In further implementations, the system can include one or more supplementary bracket(s) for coupling to one or more accessories on the article being transported, such as the outrigger on a canoe or one or more oars or paddles for personal watercraft. The supplementary bracket can be attached at a first end to the longitudinal elongate rail, and can include a second end for receiving the outrigger. The bracket can also be coupled to an upwardly extending bracket of the system or a lateral rail of the system, as described in further detail below.

Figure 29:
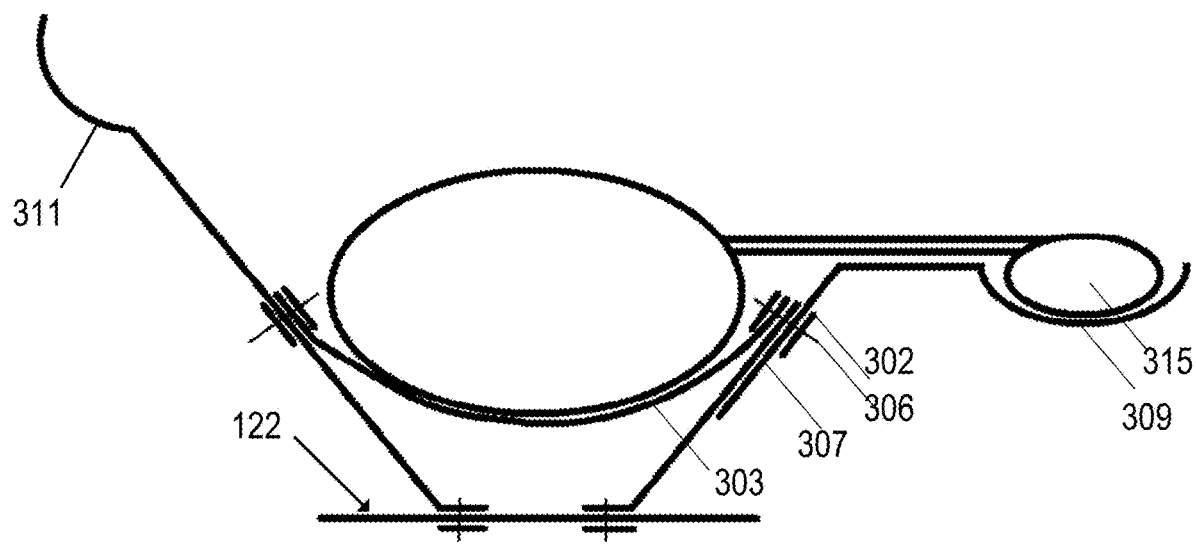
FIG. 29 is a schematic view of yet a further mounting system in accordance with the present disclosure.

For purposes of illustration and not limitation, FIG. 29 presents a further embodiment of a bracket assembly in accordance with the present disclosure. The system shares many similarities with preceding embodiments (e.g., 190, 290) in that it includes a lateral rail (e.g., 122) that is attached to adjustable upwardly extending brackets that form a V-shape and may be moved toward or away from each other and bolted in place. Clamp plates 302 may be provided, similar in configuration to clamp plates 192, 292 for bolting to each other and/or the v-brackets via nuts and bolts 306 or other suitable fasteners, for example, to hold supporting webbing 303 in place, or accessory arms, described in further detail below.

The embodiment of FIG. 29 further illustrates accessory arms 307 and 311 that can be held in place against the arms of the V-brackets via clamp plates 302, for example. Arm 311 includes a cradle at an outward end thereof that can be used to support an oar or other object that is lashed to it with an elastic cord. Similarly, arm 307 can include a cradle 309 at an end thereof for supporting an outrigger 315 for a canoe, or other article. Arms 307, 311 or variations thereof can additionally or alternatively be attached to the lateral rail 122 or the elongate rail (not shown) of the system.

The disclosure further includes methods of mounting an article to a storage location or the roof of a cart or vehicle such as a motor vehicle or a trailer. In some implementations, the method includes attaching a longitudinal elongate rail (e.g., 110) to a support, such as the roof rack of a vehicle. The longitudinal elongate rail traverses a longitudinal direction, such as parallel to a length of the vehicle. The method further includes attaching a lateral rail (e.g., 132, 232) to the elongate rail. The lateral rail can be orthogonally or obliquely oriented with respect to the longitudinal elongate rail. The lateral rail can be configured to be mounted at a plurality of longitudinal positions along the longitudinal rail. The method further includes attaching at least one upwardly extending bracket (e.g., 124, 134, 154, 164, etc.) to the lateral rail to form a concavity for receiving the article. The at least one upwardly extending bracket can be configured to be mounted at a plurality of lateral positions along the lateral rail. The method can further include mounting the article to the at least one upwardly extending bracket.

In some implementations, attaching the lateral rail to the elongate rail can include sliding the lateral rail along the elongate rail to a desired position, and affixing the lateral rail in place with respect to the elongate rail. Attaching the at least one bracket to the lateral rail can include sliding the at least one upwardly extending bracket along the lateral rail to a desired position and affixing the at least one upwardly extending bracket in place with respect to the lateral rail. The method can further include, for example, affixing a padded sling to the at least one upwardly extending bracket, the padded sling being configured for receiving a bottom surface of the article.

It will be apparent to those skilled in the art that various modifications and variations can be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

What is claimed is:

1. A rack system for securing articles, comprising:
  a longitudinal elongate rail traversing a longitudinal direction;
  a lateral rail adjustably mounted to the elongate rail, the lateral rail being orthogonally oriented with respect to said longitudinal elongate rail, said lateral rail being configured to be mounted at a plurality of longitudinal positions along said longitudinal rail;
  at least two upwardly extending brackets adjustably mounted to said lateral rail, said at least two upwardly extending brackets being configured to be mounted at a plurality of lateral positions along said lateral rail, wherein said lateral rail and said at least two upwardly extending brackets cooperate to form a concavity for at least partially surrounding a portion of an article to hold said article in position when mounted to said system; and at least one strap attached to the at least two upwardly extending brackets to define a flexible, conforming cradle to receive said portion of said article.

2. The system of claim 1, further comprising at least one bracket to removably mount said longitudinal elongate rail to a support.

3. The system of claim 1, wherein said lateral rail and said at least one upwardly extending bracket have a flat cross-section.

4. The system of claim 1, wherein said lateral rail is narrower in width than said at least one upwardly extending bracket to permit lengthwise edges of said at least one upwardly extending bracket to overlap and pass beyond lengthwise edges of said lateral rail.

5. The system of claim 1, wherein said longitudinal elongate rail defines a longitudinal track to permit said lateral rail to slide along said longitudinal direction.

6. The system of claim 1, wherein said lateral rail defines a lateral track to permit said at least one upwardly extending bracket to slide along said lateral direction.

7. The system of claim 1, wherein said at least one upwardly extending bracket is curved and defines a concave shape for receiving said portion of said article.

8. The system of claim 1, wherein said at least one upwardly extending bracket is bent to define a plurality of straight sections that cooperate to define a concave shape for receiving said portion of said article.

9. The system of claim 1, further comprising at least one removable pad that is removably attached to an inner surface of said at least one upwardly extending bracket, said at least one removable pad being configured to receive said portion of said article.

10. The system of claim 1, further comprising at least one removable pad that is removably attached to said at least one strap to cushion the cradle for receiving said portion of said article.

11. The system of claim 1, further comprising at least one strap having a first end attached to said at least one upwardly extending bracket and a second end configured to be attached to said at least one upwardly extending bracket, wherein a length of said at least one strap is configured to traverse said portion of said article and to hold said article in place against said at least one upwardly extending bracket.

12. The system of claim 1, further comprising a supplementary elongate adjustable bracket configured to be attached at a first end to said longitudinal elongate rail, and defining a second end for receiving an outrigger of a canoe mounted to said at least one upwardly extending bracket.

13. The system of claim 1, further comprising a padded end at each end of the longitudinal elongate rail to prevent collision between ends of said longitudinal elongate rail and a hood or hatch of a vehicle when the hood or hatch of the vehicle is raised.

14. The system of claim 1, further comprising at least one oar cradle adjustably attached to at least one of said longitudinal elongate rail and said lateral rail.

15. A roof-mounted system for carrying articles on top of a vehicle, comprising:

a longitudinal elongate rail traversing a longitudinal direction;

a lateral rail adjustably mounted to the elongate rail, the lateral rail being orthogonally oriented with respect to said longitudinal elongate rail, said lateral rail being configured to be mounted at a plurality of longitudinal positions along said longitudinal rail;

at least one upwardly extending bracket adjustably mounted to said lateral rail, said at least one upwardly extending bracket being configured to be mounted at a plurality of lateral positions along said lateral rail, wherein said lateral rail and said at least one upwardly extending bracket cooperate to form a concavity for at least partially surrounding a portion of an article to hold said article in position when mounted to said system; and at least one further upwardly extending bracket adjustably and slidably attached to the at least one upwardly extending bracket to adjust the overall effective length of the at least one upwardly extending bracket and the at least one further upwardly extending bracket.

16. The system of claim 15, further comprising at least one bracket for removably mounting said longitudinal elongate rail to a support.

17. A method of mounting an article to a roof of a vehicle, comprising:

attaching a longitudinal elongate rail to a roof rack of a vehicle, the longitudinal elongate rail traversing a longitudinal direction parallel to a length of the vehicle;

attaching a lateral rail to the elongate rail, the lateral rail being orthogonally oriented with respect to said longitudinal elongate rail, said lateral rail being configured to be mounted at a plurality of longitudinal positions along said longitudinal rail;

attaching at least one upwardly extending bracket to said lateral rail to form a concavity for receiving said article, said at least one upwardly extending bracket being configured to be mounted at a plurality of lateral positions along said lateral rail;

mounting said article to said at least one upwardly extending bracket by wrapping substantially the full circumferential extent of the article in an elongate pad and strapping the wrapped article to the at least one upwardly extending bracket; and affixing a padded sling to said at least one upwardly extending bracket, said padded sling being configured for receiving a bottom surface of said article.

18. The method of claim 17, wherein attaching said lateral rail to said elongate rail includes sliding said lateral rail along said elongate rail to a desired position and affixing said lateral rail in place with respect to said elongate rail.

19. The method of claim 18, wherein attaching said at least one bracket to said lateral rail includes sliding said at least one upwardly extending bracket along said lateral rail to a desired position and affixing said at least one upwardly extending bracket in place with respect to said lateral rail.

* * * * *